United States Patent

[11] 3,625,290

[72] Inventor Lynn F. Johnson
American Falls, Idaho
[21] Appl. No. 861,892
[22] Filed Sept. 29, 1969
[45] Patented Dec. 7, 1971
[73] Assignee University of Idaho Research Foundation, Inc.
Moscow, Idaho

[54] SEPARATING APPARATUS FOR MOBILE POTATO HARVESTING VEHICLE
6 Claims, 4 Drawing Figs.

[52] U.S. Cl. .................................................... 171/17
[51] Int. Cl. ................................................... A01d 17/00
[50] Field of Search ........................................... 171/17, 18; 209/173, 172, 158

[56] References Cited
UNITED STATES PATENTS
2,616,564  11/1952  Schrock .................. 171/17
2,698,087  12/1954  Call et al .................. 209/173
3,478,875  11/1969  Roberts .................... 209/173

*Primary Examiner*—Antonio F. Guida
*Attorney*—Wells, St. John & Roberts

ABSTRACT: The mobile harvesting machine has a vibrating digging means for scooping the potatoes along with foreign material (rocks, clods, vines and trash) from the ground and conveying the same to water flumes. The flumes have traps formed therein to receive the foreign materials that are heavier than the potatoes. A vine and trash conveyor remove the foreign materials that are lighter than the potatoes from the surface of the water. The potatoes flow along the flumes to a receiving tank. A conveyor removes the potatoes from the receiving tank. A recirculating pump removes the water from the tank and directs the water back to the flumes.

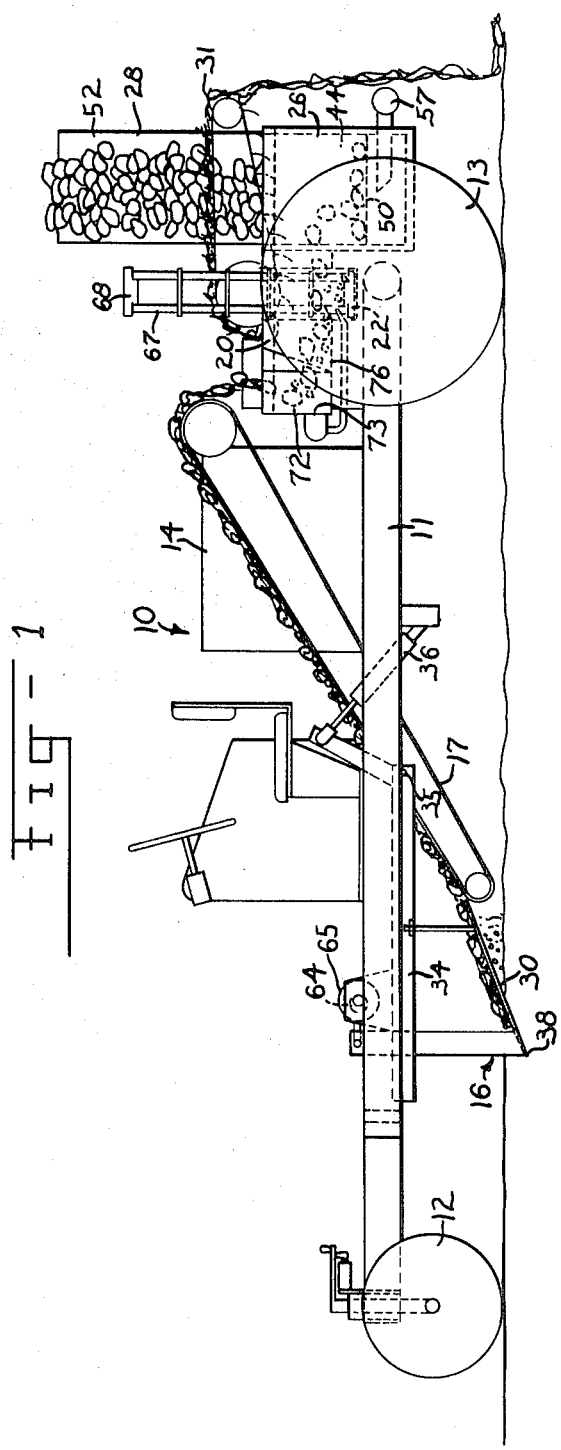

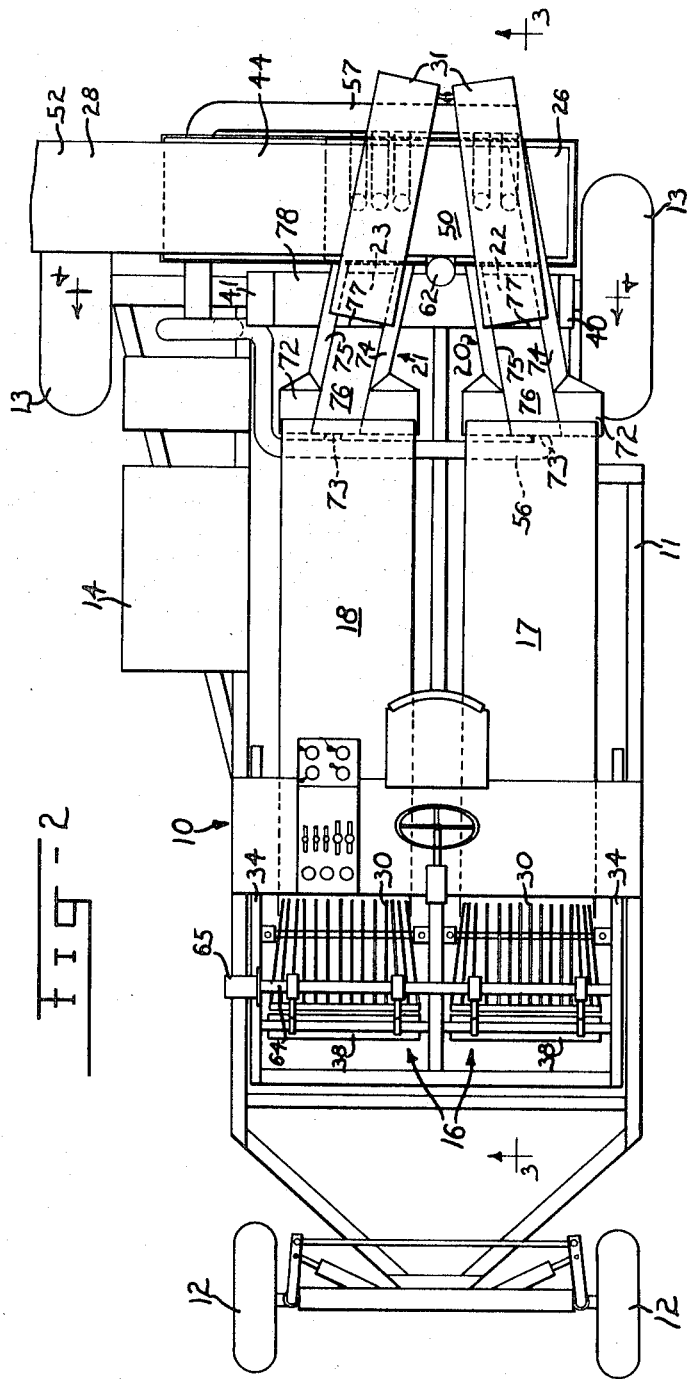

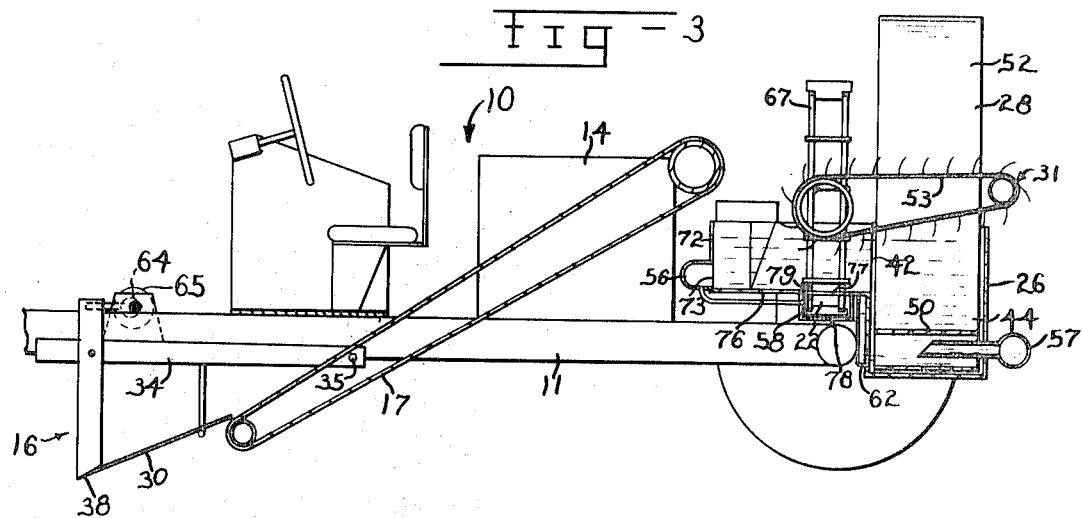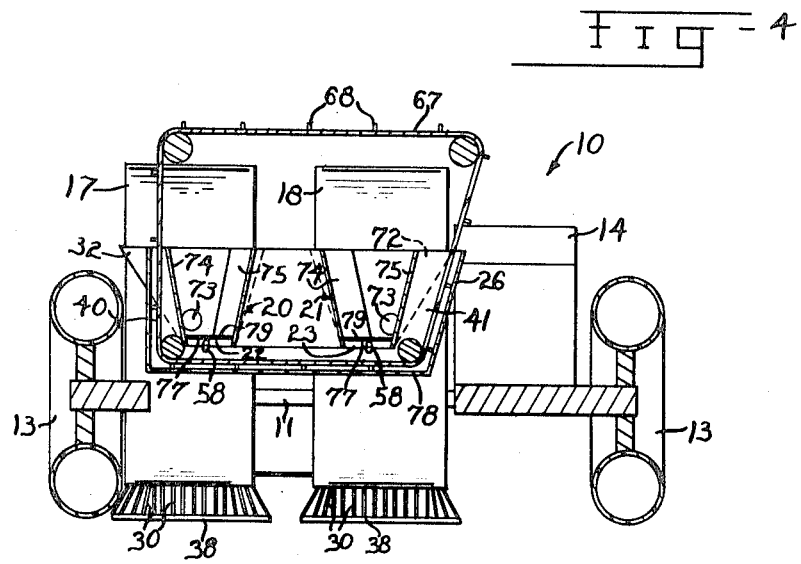

3,625,290

SEPARATING APPARATUS FOR MOBILE POTATO HARVESTING VEHICLE

BACKGROUND OF THE INVENTION

This invention relates to root-crop harvesters and more particularly to potato harvesters that are capable of separating the potatoes from foreign material, such as stones, dirt, trash and vines.

Although the harvesting of potatoes has been considerably automated, it has been difficult to construct a harvester that is capable of delicately handling the potatoes without damaging the potatoes. Studies have shown that in some parts of the United States approximately 10 percent of the potato tubers are rejected as No. 1 grade because of damage caused by the harvesting equipment. This represents an annual loss in millions of dollars. Much of the harvesting injury is caused by handling the potatoes along with stones and dirt clods. Mechanical separation on present day harvesters is only partially successful in separating the tubers from the foreign material. Much of the foreign material must still be removed by hand. Even though some mobile harvesters have preliminary separation equipment mounted thereon, it is frequently found that it is necessary to run the potatoes through a stationary separator adjacent the storage facility to remove most of the foreign material prior to storage.

U. S. Pat. No. 2,616,564 describes a mobile potato harvester utilizing a tank filled with a brine having a specific gravity greater than the potato to float the potatoes away from rocks and dirt clods. After the potatoes and foreign material are removed from the ground, they are moved up a chain conveyor in one direction and then dumped onto an inclined conveyor that is moving in the opposite direction. From the second conveyor the potatoes are dumped into the brine tank where the potatoes float to the top and the stones and dirt clods drop to the bottom. It is quite clear that this equipment is expensive and complicated. There is a considerable amount of handling of the potatoes with the potatoes being dumped from one conveyor to another. It is further difficult to maintain the brine in the tank at the desired specific gravity. If the specific gravity of the brine decreases below the specific gravity of the potatoes, the separator becomes inoperative. It should be noted that the brine tank occupies a considerable area on the harvester requiring substantial frame structure to support such a large tank.

One of the principal objects of this invention is to provide a root-crop harvester that greatly minimizes the handling of the tubers and one which is capable of efficiently and inexpensively separating the tubers from the foreign material such as stones, clods, trash, and vines.

A further object of this invention is to provide a mobile potato harvester having a compact specific gravity separator that is relatively small in size compared to its capacity to efficiently separate the potatoes from the foreign materials.

An additional object of this invention is to provide a mobile potato harvester utilizing a water stream to separate the potatoes from the foreign materials instead of a nonmoving fluid medium.

A further object of this invention is to provide a mobile potato harvester having a specific gravity separator with a single water tank that is capable of selectively separating the potatoes from foreign materials that are both heavier and lighter than the potatoes.

An additional object of this invention is to provide a separator having a fluid medium for separating potatoes from foreign materials that can be easily maintained, requiring a relatively small volume of fluid medium.

These and other objects and advantages of this invention will become apparent upon the reading of the following detailed description of a preferred embodiment.

BRIEF DESCRIPTION OF THE DRAWINGS

A preferred embodiment of this invention is illustrated in the accompanying drawings, in which:

FIG. 1 is a schematic side view of a mobile potato harvester incorporating the principle features of this invention;

FIG. 2 is a plan view of the potato harvester showing a specific gravity separator mounted adjacent to the rear thereof;

FIG. 3 is a vertical cross-sectional view taken along lines 3—3 in FIG. 2; and

FIG. 4 is a cross-sectional view taken along lines 4—4 in FIG. 2.

DETAILED DESCRIPTION OF THE PREFERRED EMBODIMENT

Referring now to the drawings that are shown in FIG. 1, a root-crop harvester 10 for removing the tubers from the soil as the harvester is propelled across the field and for separating the tubers from the foreign material such as stones, dirt clods, vines and trash that may be picked up with the tubers.

The root-crop harvester that is illustrated in the drawings is principally designed for harvesting potatoes. The principal parts include a mobile frame 11 that is supported by front wheels 12 and rear wheels 13. An internal combustion engine 14 and associated hydraulic pumps are mounted on the mobile frame for propelling the harvester and providing the power for operating the various components of the harvester.

A vibrating digging means 16 is suspended on the frame for digging into the soil to lift the potatoes and foreign material above the ground level and conveying the potatoes and the larger foreign materials rearward while permitting the smaller foreign materials, such as loose dirt, to fall back onto the ground. The vibrating digging means 16 move the potatoes and the foreign material to continuous conveyor belts 17 and 18 that extend longitudinally along the mobile frame to the rearward end of the harvester.

Flumes 20 and 21 are mounted on the mobile frame adjacent the rear end of the continuous conveyor belt 17 and 18 for receiving the potatoes and the foreign material from the conveyor belts. The flumes 20 and 21 have traps 22 and 23 respectively formed in the base thereof for receiving the heavier foreign materials while permitting the potatoes and lighter foreign materials to flow along the flumes. A receiving tank 26 is mounted along the rear of the mobile frame 11 communicating with the flumes 20 and 21 to receive the flow from the flumes.

A potato discharge conveyor 28 is mounted on the frame extending into the tank 26 to receive the potatoes and convey them from the harvester.

A stone and soil removal conveyor 30 passes through the traps 22 and 23 for removing the stones and soil from the traps and discharging the same to the side of the harvester. Vine and trash conveyors 31 and 32 are mounted on the frame elevated above the flumes and receiving tank 26 for removing the floatable material from the flumes.

More specifically the vibrating digging means 16 includes a subframe 34 that is pivotally mounted on the frame 11 for pivotable movement about a pivot point 35. The subframe is pivoted by a hydraulic cylinder 36. The digging means has a blade 38 that extends forward and downward from the subframe for projecting into the soil below the level of the potatoes to lift the potatoes and soil including the foreign material above the ground level and onto transversely spaced slats 30. The slats 30 are sufficiently spaced to permit the loose dirt to drop back to the ground while providing support for the potatoes, larger rocks and dirt clods, trash and vines. The subframe 34 is operatively connected to an eccentric shaft 64 that is rotated by a hydraulic motor 65 to vibrate the subframe 34 while the blade is scooping the potatoes to softly vibrate the potatoes rearward and onto the continuous conveyor belts 17 and 18.

Each of the flumes 20 and 21 has a large hopper end 72 for receiving the tubers and the foreign materials from the continuous belts. A water inlet 73 is formed in the hopper end 72 for supplying water to the flumes. Each flume has inclined sidewalls 74 and 75 that slope inward and downward to a bottom surface 76.

Downstream of the enlarged end 72 a trap opening 77 is formed in the bottom surface providing communication between the flume and a trap duct 78 that extends transversely underneath the flumes for permitting the heavy material such as the stones and dirt clods to drop from the bottom surface of the flumes into the trap duct 78. A deflector 79 is formed on the bottom surface 76 immediately in front of the trap opening 77 for deflecting the potatoes up and over the trap opening 77.

The trap duct 78 extends transversely under the flumes 20 and 21 terminating in upwardly extending duct sections 40 and 41. The upward extensions 40 and 41 prevent water from flowing out the trap duct.

The flumes 20 and 21 terminate in outlets 42 that communicate with the receiving tank 26. The receiving tank 26 is mounted transversely to the longitudinal axis of the mobile frame with the outlets 42 formed in the sides of the tank. The receiving tank 26 has a lower section 44 that extends downward from the flumes to provide a substantial capacity of water below the level of the outlets for receiving the potatoes.

The tuber discharge conveyor 28 is mounted on the mobile frame with a horizontal section 50 located within the tank below the level of the outlets of the flumes for receiving the potatoes. The discharge conveyor 28 has an upward-extending section 52 that extends upward and outward from the tank to one side of the harvester for conveying the potatoes to a transporting vehicle such as a truck.

Each of the vine and trash conveyors 31 and 32 have a continuous belt 53 with a plurality of curved tine fingers formed thereon that move forward along the lower flight of the conveyor for picking up trash and vines that float on the top of the water in the flumes and tank.

The water system for the flumes and receiving tank 26 includes an inlet manifold 56 interconnected to the inlets of the flumes. The water is removed from the receiving tank 26 below the level of the level section 50 of the discharge conveyor 28 so that the natural flow of the water brings the potatoes to rest on the discharge conveyor 28. The water is removed through a plurality of outlets to a common outlet manifold 57. A pump 60 interconnects the inlet manifold 56 and the outlet manifold 57 to recirculate the water through the flumes and receiving tank at a prescribed velocity. The inlet manifold 56 includes lines that extend to jet nozzles 58 that are mounted in the side of the trap duct 78 for injecting water in an upward and rearward direction to prevent potatoes from falling into the traps. The velocity of the water flowing through the flumes and receiving tank may be regulated by changing the speed of the pump so that the most efficient separation can be accomplished under the particular circumstances.

A float system 62 is mounted on the side of the receiving tank 26 for monitoring the fluid level in the tank. When the fluid level drops below a prescribed level a signal is communicated to the operator that additional water needs to be added.

It should be appreciated that the flow of water in the stream in the flumes 20 and 21 agitate the potatoes and foreign materials sufficiently to provide effective separation so that the foreign materials that are heavier than the potatoes quickly descend to the bottom of the flumes and drop into the traps 22 and 23 and that the foreign materials that are lighter than the potatoes quickly float to the top for removal by the vine and trash conveyor 31. The velocity of the movement of the water in the flumes 20 and 21 is sufficient to carry the potatoes along the flumes and over the traps and into the receiving tank 26. The deflector 79 and the jet nozzles 58 provide an assist to prevent any of the potatoes from descending into the traps.

The stone and soil removal conveyor includes a continuous chain 67 transversely mounted on the mobile frame 11 with a lower flight extending through the trap duct 78. A plurality of scrapers 68 are mounted on the chain 67 at desired intervals to scrape the stones and the soil from the trap duct and out the extension 41 to drop onto the soil as the harvester is propelled.

It should be noted that the vibrating digging means lifts the potatoes out of the soil and gradually move the tubers rearward without bruising or cutting the potatoes. The water stream in the flumes and receiving tank 26 uniformly support the potatoes without damaging the tubers. It should be appreciated that the machine greatly reduces the handling normally required to separate the potatoes from the foreign materials.

Having now described a preferred embodiment of my invention, I seek a United States Letters Patent on my invention which I define as follows:

1. A root-crop harvester for removing tubers from the soil and separating the tubers from foreign materials such as stones, dirt, and other debris, comprising:
   a. a mobile frame;
   b. an elongated horizontal flume mounted on the mobile frame having an inlet, an outlet, and a trap intermediate the inlet and outlet;
   c. a receiving tank containing water mounted on the frame for removing the tubers and foreign materials from the soil and depositing same in the flume adjacent to the inlet; and
   d. pump means mounted on the frame for pumping water horizontally into the flume at the inlet at a desired velocity to carry the tubers horizontally along the flume past the trap to the receiving tank while permitting the foreign materials having a specific gravity greater than the tubers to descend through the horizontally moving water to the bottom of the flume and into the trap.

2. A root-crop harvester as defined in claim 1 further comprising a conveyor means for removing the heavy foreign materials from the trap.

3. A root-crop conveyor as defined in claim 1 further comprising a discharge conveyor means mounted on the frame and extending into the receiving tank below the water level therein for removing the tubers from the tank.

4. A root-crop harvester as defined in claim 1 wherein the pump is operatively connected to the receiving tank to recirculate the water from the receiving tank back to the inlet of the flume.

5. A root-crop harvester as defined in claim 1 further comprising a discharge conveyor mounted on the flume and extending into the tank and wherein the water is removed from the tank and the elevation below the discharge conveyor to direct the tubers onto the discharge conveyor as the water is recirculated.

6. A root-crop harvester for removing tubers from the soil and separating the tubers from foreign materials such as stone, dirt and other debris, comprising:
   a. a mobile frame;
   b. a digging means suspended on the frame having (1) a blade for projecting into the soil to lift the foreign material and tubers from the ground as the harvester is propelled and (2) a plurality of spaced slats immediately behind the blade to receive the tubers and foreign material from the blade;
   c. vibrating means operatively connected to the blade and slats to vibrate the digging means to loosen the soil and softly vibrate the tubers and foreign material upward and rearward while permitting the smaller foreign material to fall back to the ground through the slats;
   d. an elongated horizontal flume mounted on the mobile frame having an inlet, an outlet, and a trap intermediate the inlet and outlet;
   e. a receiving tank containing water mounted on the mobile frame communicating with the outlet of the flume;
   f. conveying means mounted on the frame for conveying the tubers and foreign material from the digging means and depositing same in the flume adjacent the inlet; and
   g. pumping means mounted on the frame for pumping water into the flume at the inlet at a desired velocity to carry the tubers horizontally along the flume to the receiving tank while permitting the foreign materials having a specific gravity greater than the tubers to descend through the moving water to the bottom of the flume and into the trap.

* * * * *